B. F. PADRICK.
SAW CLAMP.
APPLICATION FILED MAR. 30, 1910.
1,024,743.
Patented Apr. 30, 1912.
3 SHEETS—SHEET 3.
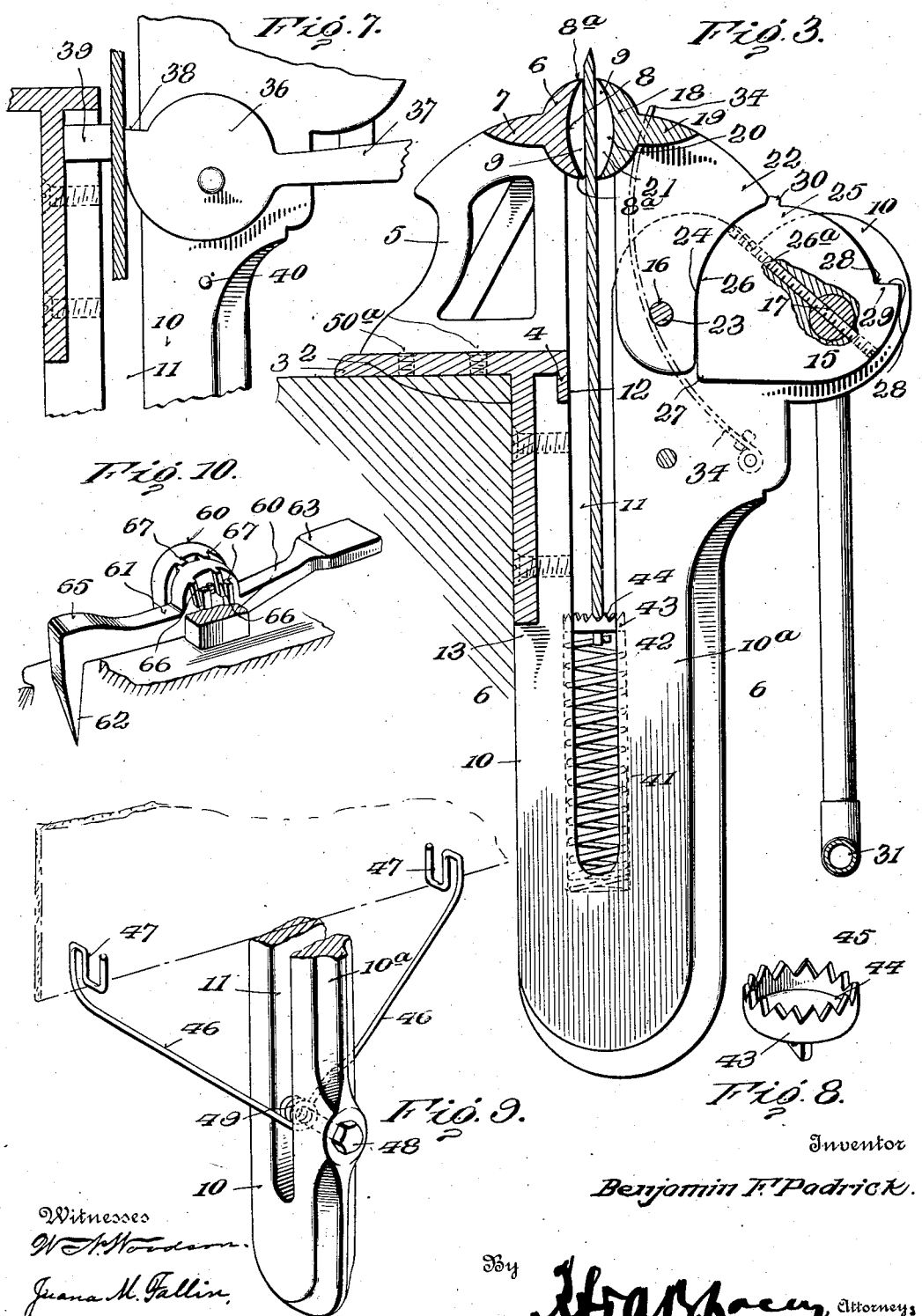
Inventor
Benjamin F. Padrick.
By
Attorneys though, however, made as light as possible.

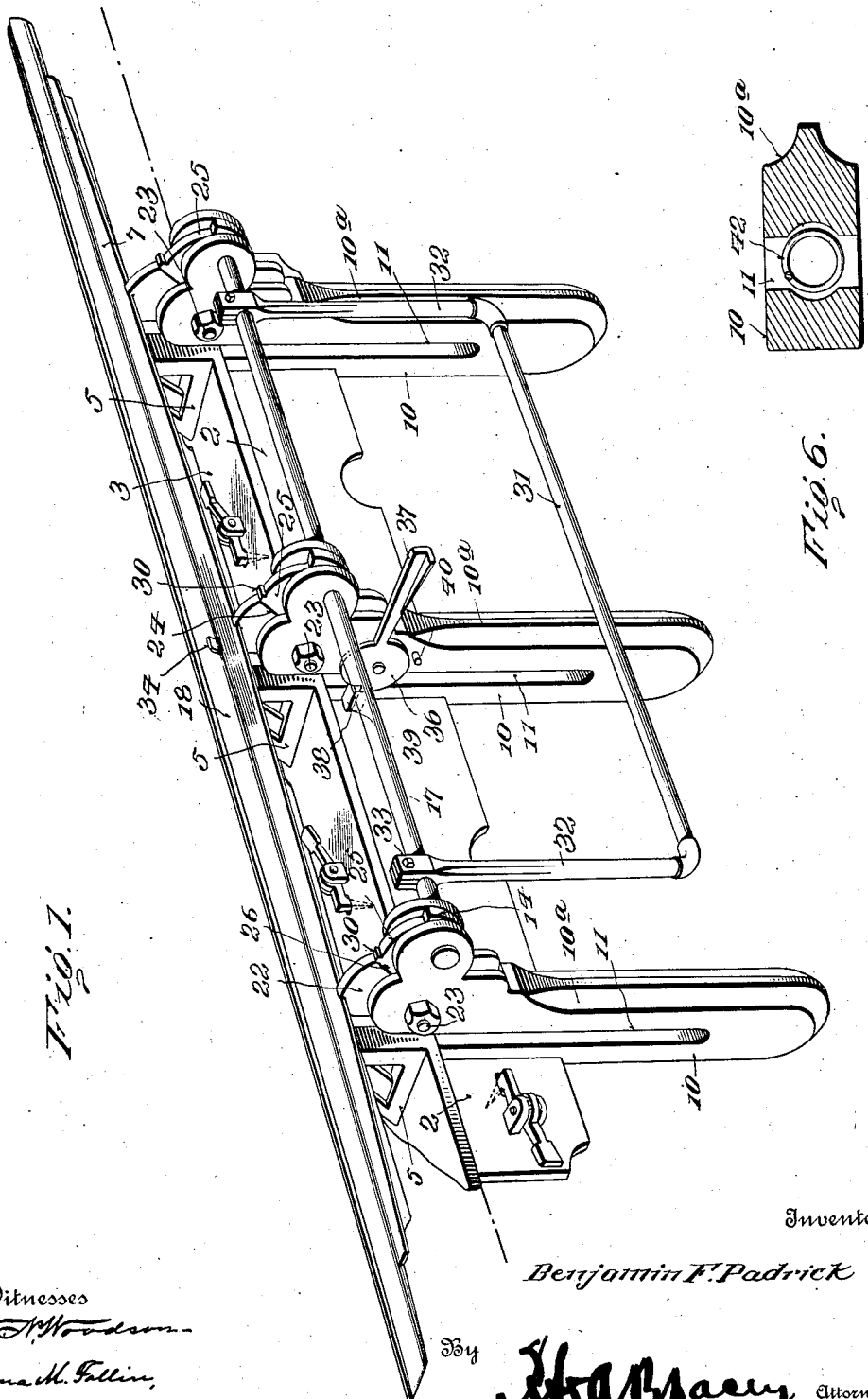

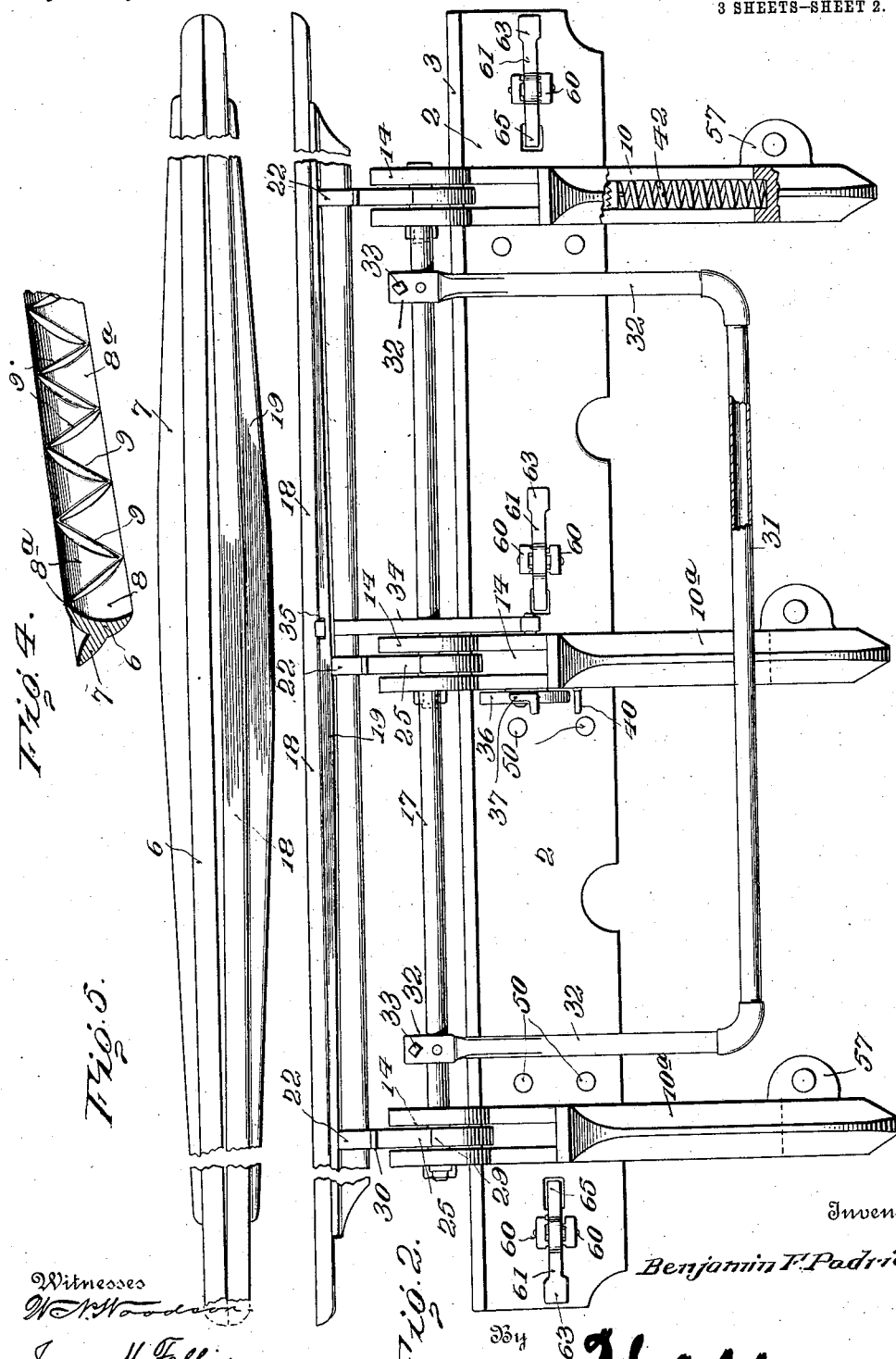

UNITED STATES PATENT OFFICE.

BENJAMIN F. PADRICK, OF PORTLAND, OREGON.

SAW-CLAMP.

1,024,743.  Specification of Letters Patent.  Patented Apr. 30, 1912.

Application filed March 30, 1910. Serial No. 552,308.

*To all whom it may concern:*

Be it known that I, BENJAMIN F. PADRICK, citizen of the United States, residing at Portland, in the county of Multnomah and State of Oregon, have invented certain new and useful Improvements in Saw-Clamps, of which the following is a specification.

My invention relates to clamps used for holding saws in position to be sharpened, and the primary object is to provide a clamp wherein saws of various widths, lengths and characteristics may be conveniently clamped and properly held, whether the saw blade be very narrow or of the ordinary width, or whether the saw be, for instance, a band saw, an ordinary saw, or a compass saw.

A further object is to provide a clamp which will engage the margin of the saw along its entire length and will thus hold the saw firmly in place, and a still further object is to provide a device wherein the clamping action is secured by a plurality of simultaneously rotatable cams, easily operated and giving a relatively strong and rigid support to the clamping members proper.

A further object is to provide a construction of this character, in which the saw, when released from the clamp, will be automatically forced upward and out of the clamp, and still further objects are to improve and perfect the detailed construction of a clamp of this character in a manner which will more fully appear in the course of this specification.

In the drawings: Figure 1 is a perspective view of my saw clamp: Fig. 2 is a front elevation: Fig. 3 is a side elevation of one of the supporting brackets, the supporting angle iron being shown in section as are also the clamping jaws; Fig. 4 is an inside face view of one of the jaws; Fig. 5 is a plan view of the clamping jaws; Fig. 6 is a transverse section on the line 6—6 of Fig. 3; Fig. 7 is a fragmentary elevation of the upper end of one of the jaw supporting brackets showing the auxiliary clamp; Fig. 8 is a detail view of the spring cap; Fig. 9 is a perspective view of a modified form of saw ejector; and, Fig. 10 is a perspective view partly broken away of one of the attaching devices.

Referring to these figures, 2 designates an angle iron of any suitable character, preferably, however, made as light as possible. The upper flange 3 of the angle iron projects on both sides over the vertical flange of the iron, and the upper flange on its inside projecting portion is formed with the downwardly extending lugs 4, for a purpose to be hereafter described. Mounted in any suitable manner upon the upper flange 3 of the angle iron are a plurality of brackets 5. These brackets may be formed in one piece with the angle iron, or attached thereto by screws. Preferably formed with brackets 5, is the longitudinally extending clamping member 6. This clamping member tapers from its middle to its ends and the outer face is formed with the longitudinally extending strengthening rib 7 which also tapers from the middle toward the ends. The inner face of the clamping member 6 is slightly concaved, as at 8, thus providing upper and lower relatively thin edges 8ª which are adapted to contact with the saw blade. In order to strengthen the clamping edges 8ª, strengthen the clamping member, and also provide diagonally extending clamping webs, the inner face of the clamping member 6, either along its whole extent, or along portions of its extent, is formed with the diagonally extending ribs 9, these ribs having preferably sharp edges. These ribs strengthen the inner face of the clamping member, as well as forming biting corrugations adapted to grip the saw.

Attached to the inside face of the angle iron 2, and with the upper end of one leg engaging against the under face of the inwardly projecting flange 3, are a plurality of bracket members 10. These bracket members are approximately U-shaped in side view, that is, each is formed with a vertically extending slot 11 which opens at the upper end of the bracket. Preferably, the inner leg of the bracket is cut away at its upper end, as at 12, so as to engage behind the lug 4 which depends from the under side of the flange 3. An interlocking engagement is thus formed between the bracket and the angle iron which holds each bracket rigidly to the angle iron. The face of the bracket is also cut away to form a shoulder 13 fitting beneath the lower edge of the angle iron 2. The outer leg of the bracket projects up above the upper face of the flange 3 of the angle iron, and this leg, at its upper end, is transversely bifurcated, as at 14. The upper end of the outer leg of each bracket is formed with openings 15 and 16, 16 being the opening for the pivot pin of the movable clamp to be later described, and 15 being a bearing for a rock shaft 17 which passes through the upper ends of the outer legs of all the brackets 10. While I may use any number of brackets 10, I preferably use three, one located at each end of the supporting angle iron 2, and the other located in the middle thereof. The movable clamping member 18 is constructed in precisely the same manner as the member 6, being provided with the longitudinally extending rib 19 and being concaved on its inner face, as at 20, the inner face being formed with the diagonally extending ribs or corrugations 21 for the same purpose as previously described. The outer clamping member is slightly bowed from one end to the other so that the jaws will normally contact with each other only at their opposite ends, and then as they are brought into closer contact they will contact along their entire face, the clamping members being tapered at the ends and being slightly resilient for this purpose. This gives a much better clamping action than would be the case were the clamping members 6 and 18 rigid and stiff. Furthermore, as the slightly bowed jaw is forced against the saw disposed between the clamping jaws and gradually becomes straight, it tends to tension the jaw longitudinally to a slight extent, thus securing a much better clamping action than if the outer jaw were straight or flat and non-elastic. The movable clamping member 18 is provided with the downwardly projecting cam faced plates or ears 22 which are pivoted by means of bolts 23 passing through the openings 16. The upper ends of the members 22 are rounded so as to conform in curvature to the upper ends of the brackets 5. The outer edge of each of the plates or ears 22 is rounded, as at 24, so as to be engaged by and contact with the rotatable cams now to be described.

Mounted upon the rock shaft 11 which passes through all of the brackets are the cams 25, each having the form shown in detail in Fig. 3. The acting face of each cam is indicated by the numeral 26 and is curved uniformly from the point 27 to the point 28. At the point 28, a shoulder 29 is formed which extends directly outward. The cam face is also provided with a projecting lug 30 which forms a stop when the cams are moved to their clamping position, this stop engaging with the lugs 22, to this end. The cams may be fastened to the rock shaft by any suitable means. They are shown as fastened each by a threaded screw 26ª passing through the rod and through each side of the cam. By attaching them in this manner, the rock shaft and cams may be removed through the spaces between the bifurcated upper ends of the main brackets 10. It will be seen that the inner face of the lug 22 conforms to the cam 26 when the cam is turned into its operative position, and that a rotation of the shaft 17 caused by depressing the handle will act to force the movable clamping member 18 toward and against the fixed clamping member 6. When the handle is lifted, the shoulder 30 rides over the shoulder 22 and along the concavely curved face of the members 22 until the shoulders 29 contact with the upper ends of the members 22. At this point the members 22 and the jaw 18 attached thereto will be fully open. Preferably, I provide a handle such as that shown in the drawing, comprising a longitudinally extending bar 31 having the inwardly extending ends 32, split at their extremities to grip over the recessed portions of the bar 17, the split extremities 32 being held in clamping engagement with the shaft 17 by means of bolts 33. When the clamps are in their engaged position, and the clamps 26 are moved into engagement with the lugs 22, the handle depends vertically so as not to be in the way.

As a means of forcing the clamping members apart from each other, I have provided the spring 34 which may be attached to the middle bracket, and whose free end extends up and is attached to the clamping member 18.

I have found in practice that it is advisable to provide an auxiliary clamp for the saw blade, which may be operated when the saw is first placed in position so as to temporarily hold the blade until properly adjusted, thus leaving the hands of the operator free to set the blade properly and operate the main clamping mechanism. For this purpose, I have provided the auxiliary cam 36 which is pivoted to one face of the middle bracket 10 and is provided with the outwardly projecting handle 37 angular in cross section. The inside face of the cam 36 is formed with a projecting shoulder 38. This shoulder, when the auxiliary cam 36 is rotated to its actuating position, will coincide with a projecting ear or lug 39 preferably attached to the inner leg of the bracket 10 in such position as to project outward and across the opening 14 a slight distance below the upper end of the inner leg 10ª. This stud and the clamping bracket being so located, may be used to properly clamp the saw and hold it in the middle of the slot 14. This clamp 36 may be easily manipulated, and thus the saw may be easily initially adjusted before the main saw clamps are set. A stop 40 projects from the face of the bracket 10 so as to be engaged by the handle 37 of the clamp 36 when the handle is turned downward. I have also found in practice that it is best to provide means for ejecting the saw from the clamp after the jaws of the clamp have been released, and to this end, I have devised springs in conjunction with the clamp, which are compressed when the saw is inserted, but which, when the saw is released, will urge the saw upward so that it may be easily removed. I preferably recess the legs of the outer brackets, as at 41, and locate therein the coil springs 42. The lower end of each spring is held in place within the recess in any suitable manner, but the upper end is free to move vertically and is preferably provided with a saw rest 43 forming a cap or terminal portion for the spring, this saw rest having the annular upwardly projecting walls 44 which are toothed at 45 so that even if the spring should turn or otherwise change its position within the recess 41, yet alining notches will always be provided, in which the edge of the back of the saw will be supported. These spiral ejector springs are made sufficiently strong to rather more than balance the weight of the heaviest full sized ordinary hand saw. In using the clamp for sharpening cross-cut saws, the extra heavy weight of the saw will press the spiral springs down tightly, one coil against the other so that the saw may occupy the full depth of the slots 14.

In Fig. 9 I show another form of this saw, supporting ejecting spring, which consists of two spring legs 46 upwardly diverged from each other and formed at their upper ends with the angular seats 47 in which the back of the saw is received. These legs 46 are resiliently supported in the lower portion of the slot 14. Preferably, a bolt 48 is provided which passes through the lower portion of the bracket from front to rear, and around this bolt 48 the wire forming the legs 46 is coiled, as at 49. While I may use this second form of ejector, I prefer the first form. I do not, however, wish to be limited in any way to these forms, as it is obvious that other means might be provided for this same purpose without departing from the spirit of the invention.

Means must be provided for the purpose of attaching the supporting angle iron 2 to a bench or other foundation. One manner of supporting this angle iron is to provide it at each end and at its middle with openings 50 through which pins, screws, or other attaching devices may be passed into the bench, and in conjunction therewith, the upper flange 3 of the angle iron is also provided with openings 50$^a$ for attaching pins. The lower portions of each of the brackets, on their inside faces, may be provided with the projecting lugs 57, cast or otherwise formed thereon, through which pins or attaching screws may be passed.

As a preferable means of attaching the clamp to a work bench, I provide bench-engaging dogs which are pivoted to the angle iron 2 and which will engage the upper and side faces of the bench. These bench-engaging dogs are all alike, and hence a description of one is sufficient for all of the dogs.

Referring to the detail view, Fig. 10, 60 designates spaced standards between which the clamping member 61 is pivoted. This clamping member has the downwardly projecting beveled tooth 62 at one end and at the other is provided with an upwardly turned extension 63. When the clamping member 61 is turned so that the extension 63 lies flat against the face of the angle iron 2, then the tooth 62 is raised in its engagement. When, on the other hand, the tooth 62 is forced into the bench, the extension 63 will be raised. The dog 61 is pivotally mounted upon the standards 64 in a manner to be now stated, and hence, it will be seen that by striking the head 65 with a hammer, the tooth 62 will be driven into the bench, while by striking the extension 63, the tooth will be raised. In order to hold the dog 61 in either of its positions, I preferably form the middle portion of the dog with the laterally extending lugs 66 and form the inside faces of the standards on each edge with the inwardly projecting flanges or ribs 67. These standards 64 are preferably slightly yielding, and thus the lugs 66 will engage with the ribs 67 in any movement of the dog. Thus, when the dog is forced into the bench, as shown in Fig. 10, one lug 66 will project beyond the ribs 67, while the other lug will be disposed inside of the other rib 67, and thus the dog will be held in its adjusted position. When the dog on the other hand, is raised from its engagement with the bench, the lugs 66 will pass the lugs 67 and thus the dog will be held open. Thus when the dog is either up or down the projections or lugs 66 in conjunction with the lug 67 will hold it in its adjusted position. The parts are made to fit tightly so that when one passes, the device is locked in that position. There are preferably two of these dogs upon the upper face of the flange 3, located as shown in Fig. 1, and there are three of the dogs upon the downwardly extending portion of the angle iron, located as shown in Fig. 2. It will be seen that these dogs must be of such dimensions that when they are closed or forced into the bench, no portion of the dogs will project out beyond the projecting margin 3$^a$ of the upper flange of the angle iron. Otherwise, the dogs will project into the way of the saws, and the saws could not be properly inserted. When the dogs are opened, they will extend out beyond said projecting portion 3$^a$, but the saws are never to be inserted when the dogs are opened.

The peculiar shape of the clamping jaw 18 is of great importance, as previously explained. The jaw 18 is curved or bowed so that at their centers the jaws are one-eighth of an inch apart when the ends are just touching. This gives a uniform grip the length of the clamp, and in addition to the spring of the jaw 18 due to the curvature above, an additional tension is secured, because of the fact that the movable jaw is supported upon the upwardly extending arms 10ᵃ of the brackets 10, and hence these arms 10ᵃ will have a certain amount of elasticity which will be exerted when the cams are operated and the movable clamping jaw 18 is forced against the saw itself. By means of the resilient jaw 18, the resiliency of the main brackets and the power secured through the use of cams and the lever for operating them, my clamp is rendered peculiarly effective and peculiarly adaptable to all varieties and types of saws.

As previously explained, the concave form of the inner faces of the clamping jaws permits these clamping jaws to be made very light and thin, thus eliminating weight and improving the symmetrical appearance of the clamp, hence the necessity of strengthening these light concave jaws by the use of the diagonal ribs. These ribs not only strengthen the jaws, as previously described, but perform a very important additional function of forming a gripping surface for engaging the saw. No saw clamp is effective which allows the saw to "wabble", and the only way in which this can be secured is by providing gripping jaws which are as well adapted for engaging a narrow saw as for engaging a wide one, and particularly, the clamp should be adapted to engage a saw which is narrower than the depth of the clamping jaws. If it is not adapted to engage over the whole face of a narrow saw, only the upper edge will be gripped, while the lower edge will be free to vibrate. In the construction illustrated, this fault is entirely eliminated by the zig-zag arrangement of ribs. No matter how small or narrow the saw, if it is large enough to enter the clamp, it will be gripped and held perfectly firm its entire length. This peculiar construction of the clamping jaws permits my clamp to be used for filing a coping saw only one-eighth of an inch in width, and saws may be accommodated from that width on up to a cross cut saw. A case knife or a carpenter's scraper may be dressed and handled with equal ease. The clamp is particularly adapted to holding a light band saw, such as mills and factories use.

In connection with the auxiliary clamp 37 and the projecting lug 39, it may be pointed out that this lug 39 is so spaced from the clamping jaws that it will come below the back of a small back saw and above the back of a large back saw or miter box saw.

The use of the auxiliary cam 36 is as follows: In placing the saw in the clamp preparatory to filing, one hand of the operator presses the saw down on the coil springs, to bring the margin above the clamping jaw, while the other hand of the operator manipulates the cam 36 until the main cams are operated. The auxiliary cam may be used, or not, at pleasure. At the final operation of filing, the main cams are released, and then the auxiliary cam may be released. This auxiliary cam merely permits of a better and easier manipulation of the saw blade and of course need not be used in all cases. It is essential however, to use the auxiliary cam 36 when "tooth pick" or worn out saws are in the clamp. An old or worn out saw is very narrow at its extremity as compared with a full sized, new saw. Hence, in case an old saw was placed within the clamp, only one ejector spring could operate, and the end of the saw would drop below the proper position. Here the clamp 36 secures the saw and prevents its dropping below the clamp and dulling the teeth.

In order to use the clamp for filing small band saws, a small hole is drilled at each side of the clamp, in the inside jaw 6, and a brad, nail, or other like article is inserted in this opening to hold up the saw tooth to uniform height above the clamp. This brad may project some distance toward the opposite jaw, without interfering with it, owing to the concavity of the jaws.

In filing a short saw of any kind, two strips of thin metal, having the same thickness as that of the saw should be used, one opposite each of those cams past which the saw does not extend. These strips of metal or filling pieces take up strain and prevent the racking of the clamp.

Having thus described the invention, what is claimed as new is:

1. In a saw clamp, opposed longitudinally extending resilient jaws, the side faces of said jaws being concave and said faces being formed with corrugations extending from one edge of the jaw to the other.

2. In a saw clamp, opposed longitudinally extending resilient jaws, one of said jaws being bowed outward from end to end, the inner faces of said jaws being concave and formed with corrugations crossing said concave face.

3. In a saw clamp, opposed longitudinally extending resilient jaws, one of said jaws being bowed outward from end to end and tapering from the middle toward each end, the side faces of said jaws being concave and formed with transverse corrugations extending from one edge of the jaw to the other edge thereof.

4. In a saw clamp, a longitudinally extending angle iron adapted to be attached to a bench, a longitudinally extending fixed jaw supported on the angle iron, a plurality of brackets depending from the angle iron able jaw opposed to the fixed jaw, said jaw below the fixed jaw and having upwardly extending bifurcated arms, a movable jaw opposed to the fixed jaw and having a plurality of lugs received in said bifurcated arms, a plurality of cams mounted in the bifurcated arms to engage said lugs, a shaft on which the cams are mounted, and a handle for operating said shaft.

5. In a saw clamp, a longitudinally extending angle iron adapted to be attached to a bench, upwardly extending supports on the angle iron, a longitudinally extending jaw mounted on said supports, brackets depending from the angle iron and having upwardly extending arms bifurcated at their upper ends, a longitudinally extending bowed resilient jaw opposed to the fixed jaw and having lugs extending into the bifurcations of the brackets, cams mounted in the bifurcated brackets engaging said lugs, a shaft extending through the said brackets on which the cams are mounted, and a handle for operating said cams.

6. In a saw clamp, opposed longitudinally extending jaws, means for moving said jaws toward or away from each other to clamp a saw between them, and an auxiliary clamp mounted below said jaws, said auxiliary clamp being independently operated with relation to the jaws.

7. In a saw clamp, a longitudinally extending fixed jaw, a bracket depending from the fixed jaw and having an upwardly extending arm, a movable jaw mounted on the upper end of said arm opposite to the fixed jaw, means for moving the movable jaw into and out of engagement with the fixed jaw, and an auxiliary clamp mounted on the bracket below the fixed jaw and adapted to engage the saw, said auxiliary clamp being independently operated with relation to the jaws.

8. In a saw clamp, a longitudinally extending fixed jaw, a plurality of brackets depending below the fixed jaw and having upwardly extending arms, a movable jaw pivoted to said brackets opposite to the fixed jaw, means for moving said movable jaw into and out of contact with the fixed jaw, an abutment on one of the brackets below the jaws, and an eccentric clamp mounted on said bracket for rotation into engagement with said abutment and forming an auxiliary clamping device.

9. In a saw clamp, a longitudinally extending supporting member adapted to be attached to a bench and having upwardly extending brackets rigidly attached thereto, a longitudinally extending fixed jaw mounted on the upper ends of the brackets and extending at each end beyond the same, a plurality of brackets depending from the supporting member, each bracket having an upwardly extending resilient arm, a movable jaw opposed to the fixed jaw, said jaw being bowed outwardly from end to end, ears depending from the movable jaw and pivotally engaged with the upper ends of the resilient arms of the brackets, each ear having a concavely curved outer face, a plurality of cams, one for each resilient arm and pivotally mounted in the upper ends of the resilient arms, each engaging one of said ears, the cams being provided with limiting shoulders engaging with the ears to prevent the complete rotation of the cams, means for simultaneously rotating the cams to force the movable jaw against the fixed jaw, and a spring engaging with the movable jaw to move it outward.

10. In a saw clamp, opposed longitudinally extending saw clamping members, means for moving said members toward or from each other, and a saw supporting spring located below the clamping members and independently movable with relation thereto, said spring acting to force the saw outward beyond the clamping members when the clamping members are released.

11. In a saw clamp, opposed clamping members, brackets at the opposite ends of the clamping members for supporting the same, said brackets being formed each with a saw receiving recess extending downward beneath the clamping members, and springs located in said recess and adapted to engage a saw to force it upward and outward out of engagement with the clamping members when the clamping members are released from engagement with the saw to permit the saw to be withdrawn.

12. In a saw clamp, opposed longitudinally extending saw-clamping members, means carried by said clamping members for forcing the saw upward between said clamping members when the clamping members are released, and means for forcing the clamping members toward each other and against the saw, the saw being held thereby rigidly in position against the force of the saw supporting spring.

13. In a saw clamp, opposed clamping members, brackets extending downward from the clamping members, said brackets being vertically recessed beneath the clamping members, coiled springs in the brackets, and a cap on the upper ends of each of said coiled springs, said cap having a plurality of radial notches.

14. In a saw clamp, a supporting member adapted to be attached to a bench and attaching devices pivoted upon the face of the supporting member, said attaching devices each consisting of an angular body portion pivoted at its middle and provided at one end with an inwardly extending tooth, said supporting member having an opening through which the tooth passes to engage the bench, and means for frictionally holding the angular body from movement into or out of its engaging position.

15. In a saw clamp, a supporting member adapted to be attached to a bench, and attaching devices mounted on the supporting member, each of said devices comprising spaced standards, an angular body pivoted between said standards, one end of said body being formed with an inwardly projecting bevel tooth, and means on the standards and body for holding the body set in either of its adjusting positions.

In testimony whereof I affix my signature in presence of two witnesses.

BENJAMIN F. PADRICK. [L. S.]

Witnesses:
L. L. LEVINGS,
F. H. KELLEY.

Copies of this patent may be obtained for five cents each, by addressing the "Commissioner of Patents, Washington, D. C."